(12) United States Patent
Matsuoka et al.

(10) Patent No.: US 7,011,352 B2
(45) Date of Patent: Mar. 14, 2006

(54) UNDER FLOOR STORAGE COMPARTMENT FOR VEHICLE

(75) Inventors: Ryosuke Matsuoka, Shioya-gun (JP); Satoru Nagamoto, Utsunomiya (JP); Hajime Mochizuki, Fuji (JP); Kenichi Kamio, Fujinomiya (JP)

(73) Assignees: Honda Motor Co., Ltd., Tokyo (JP); Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 10/940,542

(22) Filed: Sep. 14, 2004

(65) Prior Publication Data

US 2005/0104402 A1 May 19, 2005

(30) Foreign Application Priority Data

Sep. 19, 2003 (JP) ............................. 2003-328922

(51) Int. Cl.
  *B60N 3/12* (2006.01)
(52) U.S. Cl. .................................. 296/37.14; 296/37.3
(58) Field of Classification Search ............ 296/37.14
See application file for complete search history.

(56) References Cited

U.S. PATENT DOCUMENTS

| | | | | |
|---|---|---|---|---|
| 2,568,628 A | * | 9/1951 | Herring ..................... | 414/462 |
| 5,979,962 A | * | 11/1999 | Valentin et al. ............ | 296/37.1 |
| 6,033,003 A | * | 3/2000 | Bell et al. .................. | 296/37.3 |
| 6,102,464 A | * | 8/2000 | Schneider et al. .......... | 296/37.3 |
| 6,145,907 A | * | 11/2000 | Maruyama et al. ...... | 296/37.14 |
| 6,155,625 A | * | 12/2000 | Felix ....................... | 296/37.14 |
| 6,247,741 B1 | * | 6/2001 | Seel et al. ................ | 296/37.14 |
| 6,338,518 B1 | * | 1/2002 | D'Annunzio et al. .... | 296/37.14 |
| 6,467,829 B1 | * | 10/2002 | Kaluszka et al. ........ | 296/37.14 |
| 6,905,155 B1 | * | 6/2005 | Presley et al. ............. | 296/37.2 |
| 6,921,129 B1 | * | 7/2005 | Katz et al. ................ | 296/37.14 |
| 2004/0105744 A1 | * | 6/2004 | Warner et al. ............. | 414/522 |
| 2004/0227386 A1 | * | 11/2004 | Tsujibayashi et al. .... | 297/344.1 |

FOREIGN PATENT DOCUMENTS

| | | |
|---|---|---|
| JP | 63-91952 | 6/1988 |
| JP | 11-105746 | 4/1999 |

OTHER PUBLICATIONS

English Translation of JP 11-105746, Apr. 20, 1999, Honda Motor.
WO 01/49528 A1, Rotary Storage Apparatus for Motor Vehicles, Publication Date: Jul. 12, 2001.

* cited by examiner

*Primary Examiner*—Kiran B. Patel
(74) *Attorney, Agent, or Firm*—Rankin, Hill, Porter & Clark LLP (57) ABSTRACT

A vehicle under floor storage compartment is proposed which includes a rotating tray provided in a concave storage portion formed underneath a floor panel, and a first lid which opens and closes this storage portion. An engagement portion is provided upon the rotating tray, while a locking unit which engages to this engagement portion and stops the rotation of the rotating tray is provided to the storage portion; and this locking unit is arranged to be engaged to the engagement portion of the rotating tray along with the closing action of the first lid. Even small items of baggage can be simply extracted, baggage therein does not shift during vehicle operation, efficient use of available space can be ensured, and items of baggage can be removed smoothly.

4 Claims, 13 Drawing Sheets

UNDER FLOOR STORAGE COMPARTMENT FOR VEHICLE

BACKGROUND OF THE INVENTION

1. Field of the Invention

The present invention relates to an under floor storage compartment for a vehicle, and more particularly relates to an under floor storage compartment for a vehicle, in which a rotating tray is provided.

Priority is claimed on Japanese Patent Application No. 2003-328922, filed Sep. 19, 2003, the content of which is incorporated herein by reference.

2. Description of the Related Art

There is a per se known type of under floor storage compartment for a vehicle, which provides a storage space for a spare tire of the vehicle, and which is constructed in the floor panel between the left and right front seats of the vehicle, with the opening of this storage compartment being covered over by a lid which is provided as hinged to the floor panel and which can be opened and closed (refer to Japanese Patent Application Unexamined Publication No. 11-105746).

According to this type of under floor storage compartment for a vehicle, there is the merit that it is easy to perform the task of taking out the spare tire of the vehicle, since the spare tire is taken out along a stepped portion which is formed between the front seats and the rear seats by opening the rear side of the lid, without any requirement to put down the front seats.

Although there is no problem when using the above described under floor storage compartment for a vehicle for storage of baggage for which the frequency of use is relatively low, such as a spare tire or the like, by contrast, if this under floor storage compartment is used as a location for storing small objects other than the spare tire, there is the problem that it is only possible for the riders in the rear seats of the vehicle to extract such baggage items. Furthermore, if a small item of baggage has been put into a voluminous storage space such as one which can be used for storing a spare tire, the problem may arise that, when taking this item of baggage out from the storage space, it may be difficult for the user to reach the baggage item by hand, since it is necessary for him to fumble around within this voluminous space.

SUMMARY OF THE INVENTION

The present invention has been conceived of in the light of the above described problems, and its objective is to propose an under floor storage compartment for a vehicle, from which it is possible to take out an item of baggage simply and easily even if it is small, in which baggage items do not move around while the vehicle is in motion, which can offer a voluminous storage space, and from which baggage can be taken out smoothly and efficiently.

In order to solve the above described problems, according to the present invention, there is provided an under floor storage compartment for a vehicle, comprising: a rotating tray (for example, in the disclosed preferred embodiment, the rotating tray 25) in a concave storage portion (for example, in the disclosed preferred embodiment, the concave storage portion 6) which is provided underneath a floor panel (for example, in the disclosed preferred embodiment, the floor panel 5); a lid (for example, in the disclosed preferred embodiment, the first lid 8) which opens and closes the concave storage portion; an engagement portion (for example, in the disclosed preferred embodiment, the engagement portion 40) upon the rotating tray; and an engagement device (for example, in the disclosed preferred embodiment, the locking unit 60) in the concave storage portion which stops the rotation of the rotating tray by engaging to the engagement portion; wherein the engagement device is engageable to the engagement portion of the rotating tray in association with the closing action of the lid.

With the thus constructed under floor storage compartment for a vehicle, it is possible easily to take out an item of baggage which has been stored within the rotating tray in any position, simply by opening the lid and rotating the rotating tray. Furthermore, it is possible to present rotational displacement of the rotating tray when the vehicle is running, since the rotation of the rotating tray is stopped by the engagement device engaging to the engagement portion when the lid is closed.

Moreover, since the rotating tray is provided with the engagement portion, and the engagement device which corresponds thereto is provided to the concave storage portion, accordingly it is possible to provide this engagement portion and this engagement device outside the rotating tray, so that, as compared with a case in which the engagement portion and the engagement device are provided inside the rotating tray, it becomes possible to ensure maximization of the available space for storage within the rotating tray.

Preferably, in the under floor storage compartment for a vehicle as described above, the engagement device comprises a position adjustment mechanism (for example, in the disclosed preferred embodiment, the cam 120, the guide hole 122, and the pin 112) which absorbs upwards and downwards positional deviation of the lid.

With the thus constructed under floor storage compartment for a vehicle, even if the position of the lid in the vertical direction has deviated by a greater or lesser amount with respect to the concave storage portion, it is possible to adjust for this deviation with the position adjustment mechanism of the engagement device, so that it is possible for the engagement device to be reliably engaged to the engagement portion, and it is thereby possible to stop rotation of the rotating tray.

Preferably, in the under floor storage compartment for a vehicle as first described above, the engagement device comprises an engagement rod (for example, in the disclosed preferred embodiment, the rod case 106) which engages with the engagement portion, and further comprises a switch member (for example, in the disclosed preferred embodiment, the switch member 61) which executes its stroke upon closing operation of the lid, a linking member (for example, in the disclosed preferred embodiment, the cam 120) which is linked thereto, and a position adjustment mechanism (for example, in the disclosed preferred embodiment, the guide hole 122 and the pin 112) between the linking member and the engagement rod which absorbs upwards and downwards positional deviation of the lid.

With the thus constructed under floor storage compartment for a vehicle, even if the position of the lid in the vertical direction has deviated by a greater or lesser amount with respect to the concave storage portion, if the engagement rod engages to the engagement portion due to closing operation of the lid, it is possible to ensure by the position adjustment mechanism that the shifting of the switch member outside its predetermined range (for example, in the disclosed preferred embodiment, its stroke amount D) caused by positional deviation of the lid in the vertical direction is not transmitted to the engagement rod.

Preferably, the linking member is a cam (for example, in the disclosed preferred embodiment, the cam 120) which rotates together with the operation of the switch member, and the position adjustment mechanism comprises a pin (for example, in the disclosed preferred embodiment, the pin 112) which is provided to the engagement rod, and a guide means (for example, in the disclosed preferred embodiment, the guide hole 122) which is formed upon the cam and which is engaged with the pin, wherein the guide means comprises an over stroke section (for example, in the disclosed preferred embodiment, the over stroke section 122*b*) which, when the lid is in its closed operational position, permits shifting only of the pin within a predetermined error range (for example, in the disclosed preferred embodiment, the distance S).

With the thus constructed under floor storage compartment for a vehicle, even if an error has arisen in the closed operational position of the lid, and the pin has shifted within a certain range for this positional error, it is possible to ensure that displacement of the pin due to the over stroke section of the guide means (for example, in the disclosed preferred embodiment, the guide groove) does not reach the engagement rod.

DESCRIPTION OF THE PREFERRED EMBODIMENT

In the following, a preferred embodiment of the present invention will be explained with reference to the appended drawings.

Figure 1:
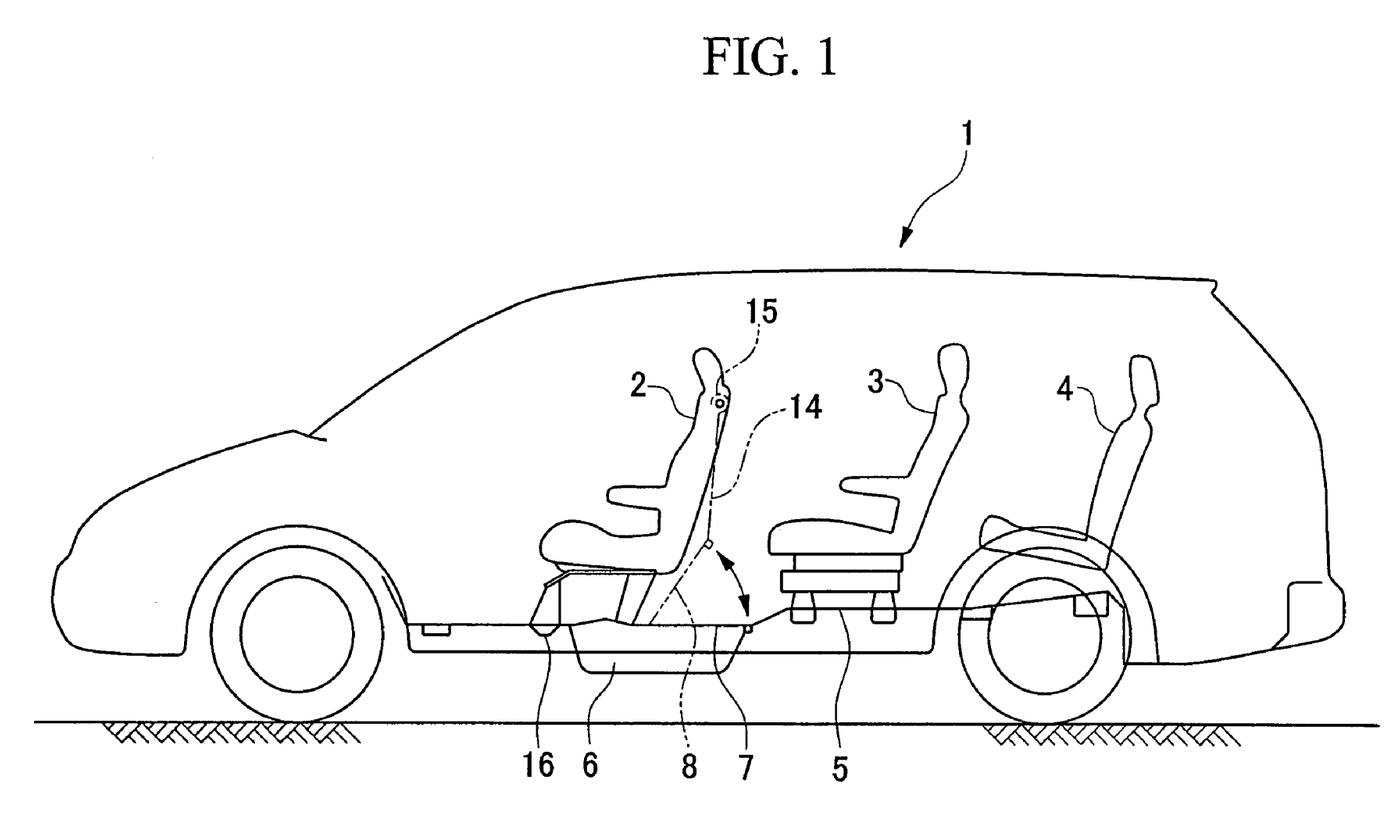
FIG. 1 is an explanatory figure showing a side view of an automobile which incorporates an under floor storage compartment for a vehicle according to a preferred embodiment of the present invention.

FIG. 1 shows an example of a vehicle to which the construction for a vehicle under floor storage section according to this preferred embodiment of the present invention has been applied; the shown vehicle, designated by the reference symbol 1, is a vehicle of the "two-box" type which is equipped with three rows of seats.

This vehicle 1 has a seat arrangement structure in which there are arranged upon its floor, in order from its front towards its back, a first row consisting of two seats 2, a second row consisting of two seats 3, and a third row consisting of two seats 4, each of these seat rows extending across the vehicle in its transverse direction.

A concave portion 6 for the storage of baggage is provided to the floor panel 5 underneath the first row of seats 2 by forming a downward extending bulge therein. And a first lid 8 is fitted at the rear side of an upper opening portion 7 of this concave storage portion 6, so as to cover it over, so that, by opening this first lid 8, a person sitting in the second row of seats 3 is able to extract an item of baggage in the concave storage portion 6.

Figure 2:
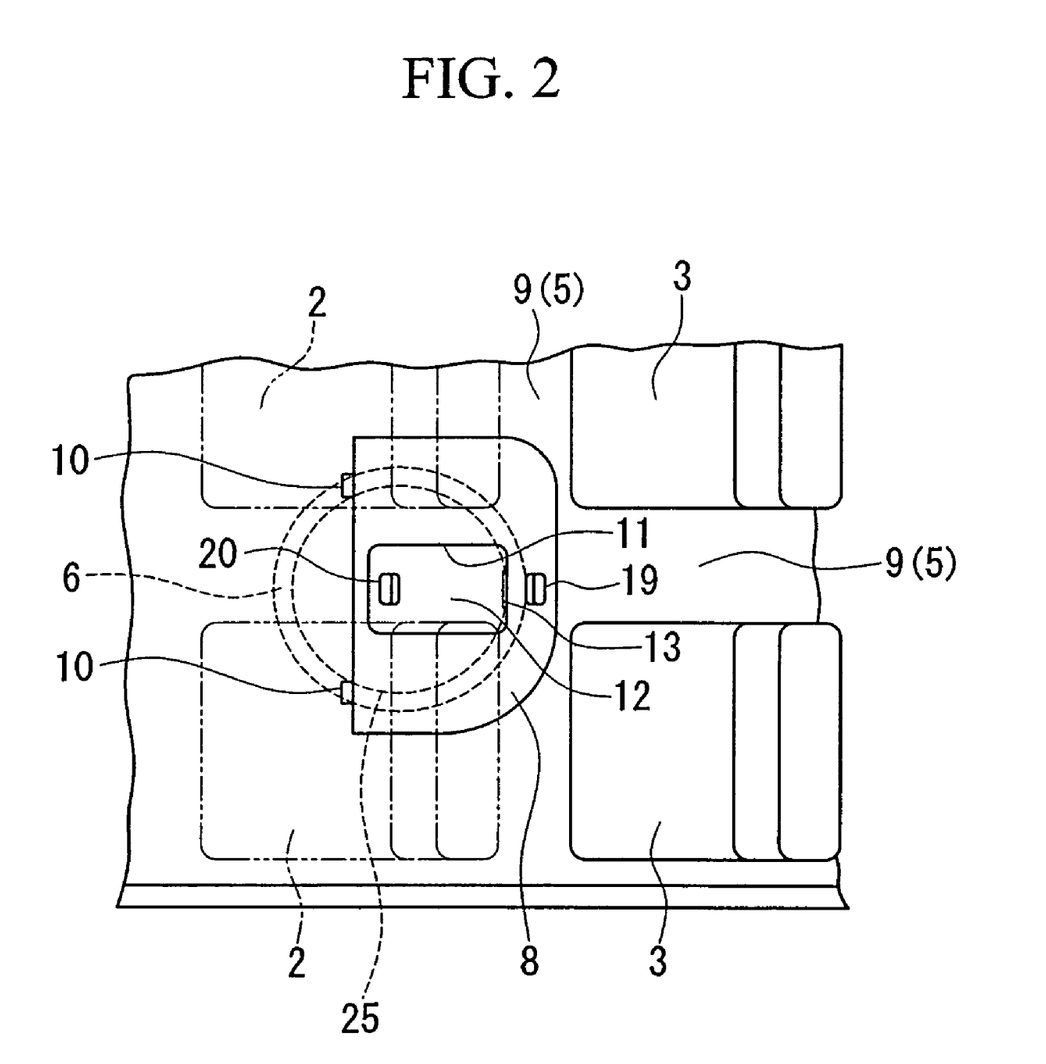
FIG. 2 is an enlarged plan view showing an essential portion of FIG. 1.
Figure 3:
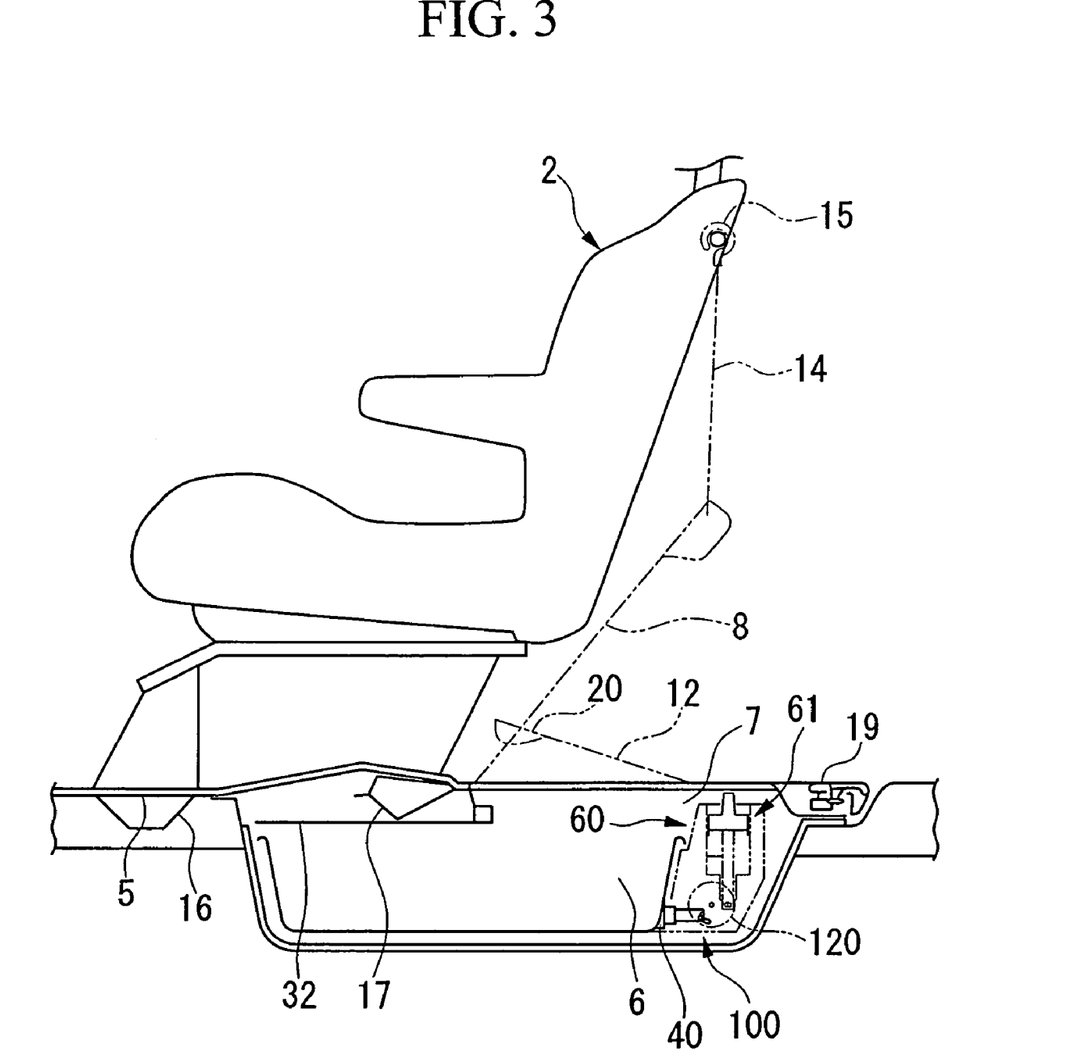
FIG. 3 is an enlarged view showing an essential portion of FIG. 1.

As shown in FIGS. 2 and 3, a passage 9 is defined between the pairs of seats 2, 3, and 4, and it is arranged for the passengers in the vehicle to be able to move between the front and the rear, and the left and the right, of the vehicle via this passage 9, with the first lid 8 being disposed between the two seats 2, 2 at the left and the right sides of the first seat row, and being hinged to the floor panel 5 by a pair of hinge brackets 10 which are provided at its front edge, so as to be rotatable with respect to the floor panel 5.

The first lid 8 is a member whose front edge is formed as a straight line and is positioned along the transverse direction of the vehicle, while its rear edge is positioned somewhat forward from the front edges of the seat cushions of the seats 3 in the second seat row; and both side portions of this rear edge are formed as rounded shapes, and are arranged so as, within the limitations of possibility, not to encroach upon the space for the feet of the passengers who are seated in this second row of seats 3, when the first lid 8 is opened and closed.

And an opening portion 11 is formed in this first lid 8 at a location which is positioned between the two seats 2, 2 in the first row of seats, and a second lid 12 is hinged at its rear edge to the first lid 8 by a hinge bracket 13, so as to be rotatable with respect to the first lid 8, and so as to open and close at its front end, thus controlling the opening and closing of the opening portion 11; and thereby, the people who are sitting in the first row of seats 2 are enabled to extract items of baggage which are stored within the concave storage portion 6.

Furthermore, as shown in FIGS. 1 and 3, a wire 14 is fitted to the rear side of the first lid 8, and a hook 15 at the end portion of this wire 14 is made so as to be clipped to the rear side of the first lid 8 (not shown), so that, when the first lid 8 is in its opened state, it becomes possible to support the first lid 8 by engaging this hook 15 to the seat back of one of the seats 2 in the first row of seats.

In this connection, as shown in FIG. 3, front and rear cross members 16 and 17 which correspond to the front edges and the rear edges of the seats 2 in the first row of seats are arranged to extend under the floor panel 5 in the transverse direction of the vehicle, and the concave storage portion 6 is formed so as to straddle the rear side cross member 17 from front to back, with the front edge of the first lid 8 being positioned a little rearward of the rear cross member 17.

Figure 4:
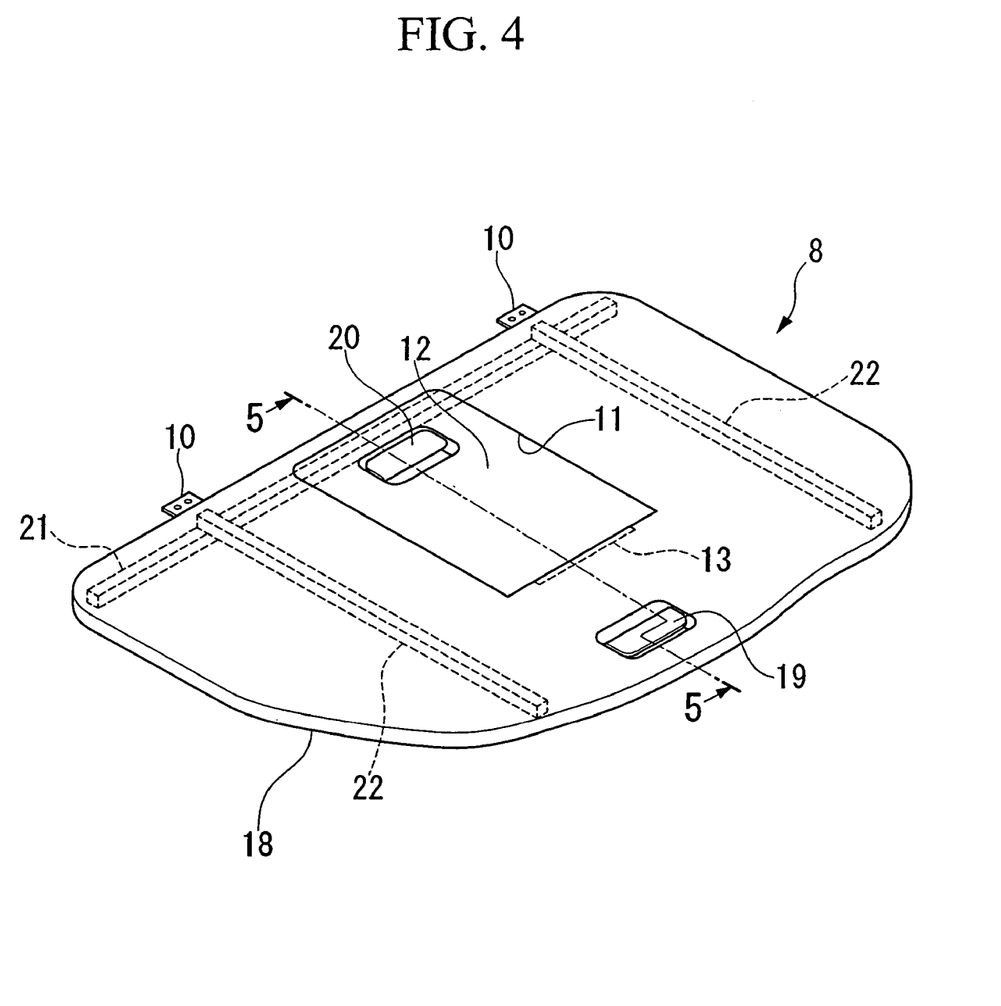
FIG. 4 is a perspective view of a first lid.

As shown in FIG. 4, the first lid 8 has a multi layered resin plate construction based upon a main member 18 which is made from resin, and metallic frame members 21, 22 are internally housed within portions (not shown in the figure) of closed box cross sectional structure which are formed on this main member 18. Furthermore, in the same manner, the second lid 12 as well is made with a multi layered resin plate construction, and a closed box cross sectional structure portion thereof (not shown in the figure) which is formed at its peripheral edge portion is arranged to be supported upon a closed box cross sectional structure portion (also not shown in the figure) which is formed at the peripheral edge of the opening portion 11 of the first lid 8.

In this manner, the first lid 8 and the second lid 12 are positioned above the surface of the floor panel 5, thereby ensuring sufficient structural strength for supporting the body weight of passengers who are moving to and fro along the passage 9.

Note that the reference symbol 19 denotes a handle for the first lid 8, while 20 denotes a handle for the second lid 12.

Figure 5:
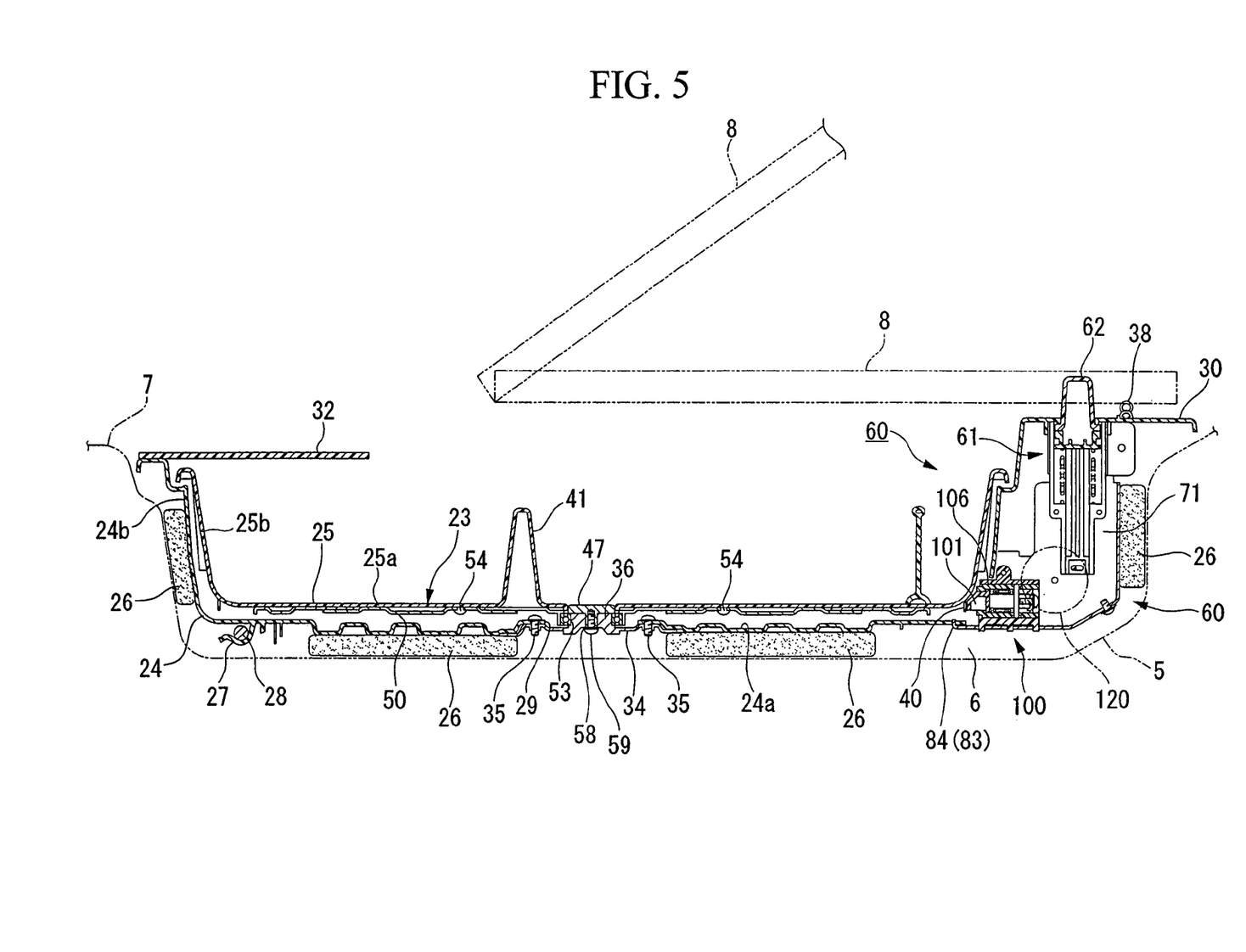
FIG. 5 is a sectional view taken in a plane shown by the arrows 5—5 in FIG. 4.
Figure 6:
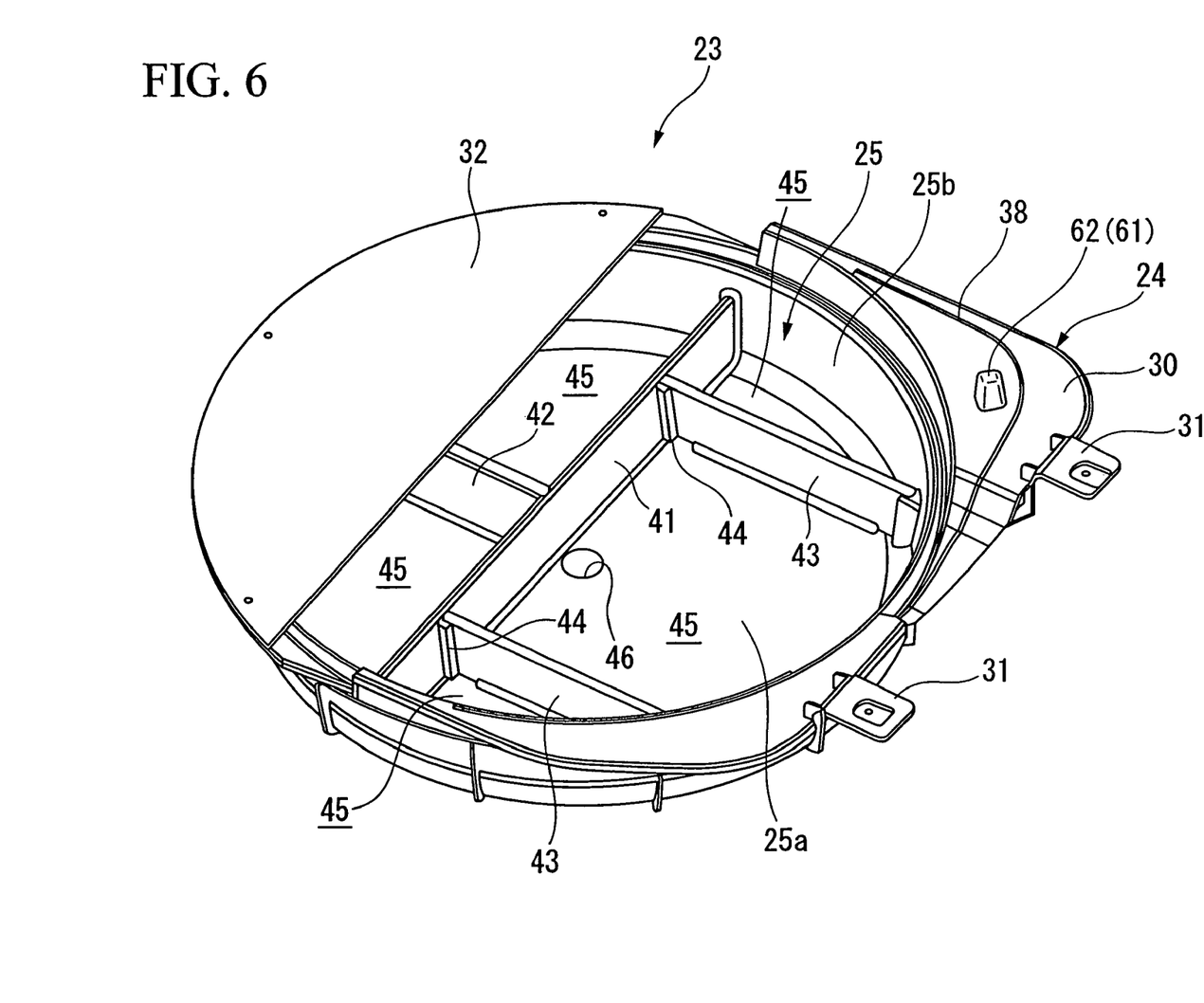
FIG. 6 is a perspective view of a tray unit.

A tray unit 23 shown in FIGS. 5 and 6 is carried in the concave storage portion 6 beneath the first lid 8 which is arranged in this manner.

This tray unit 23 composes a tray main body 24 which is made from a resin material and which is formed, facing the underside of the floor panel 5, in a shape which conforms to the shape of the concave storage portion 6, and a rotating tray 25 which is provided so as to be rotatable within this tray main body 24 and which is made from a resin material.

Figure 7:
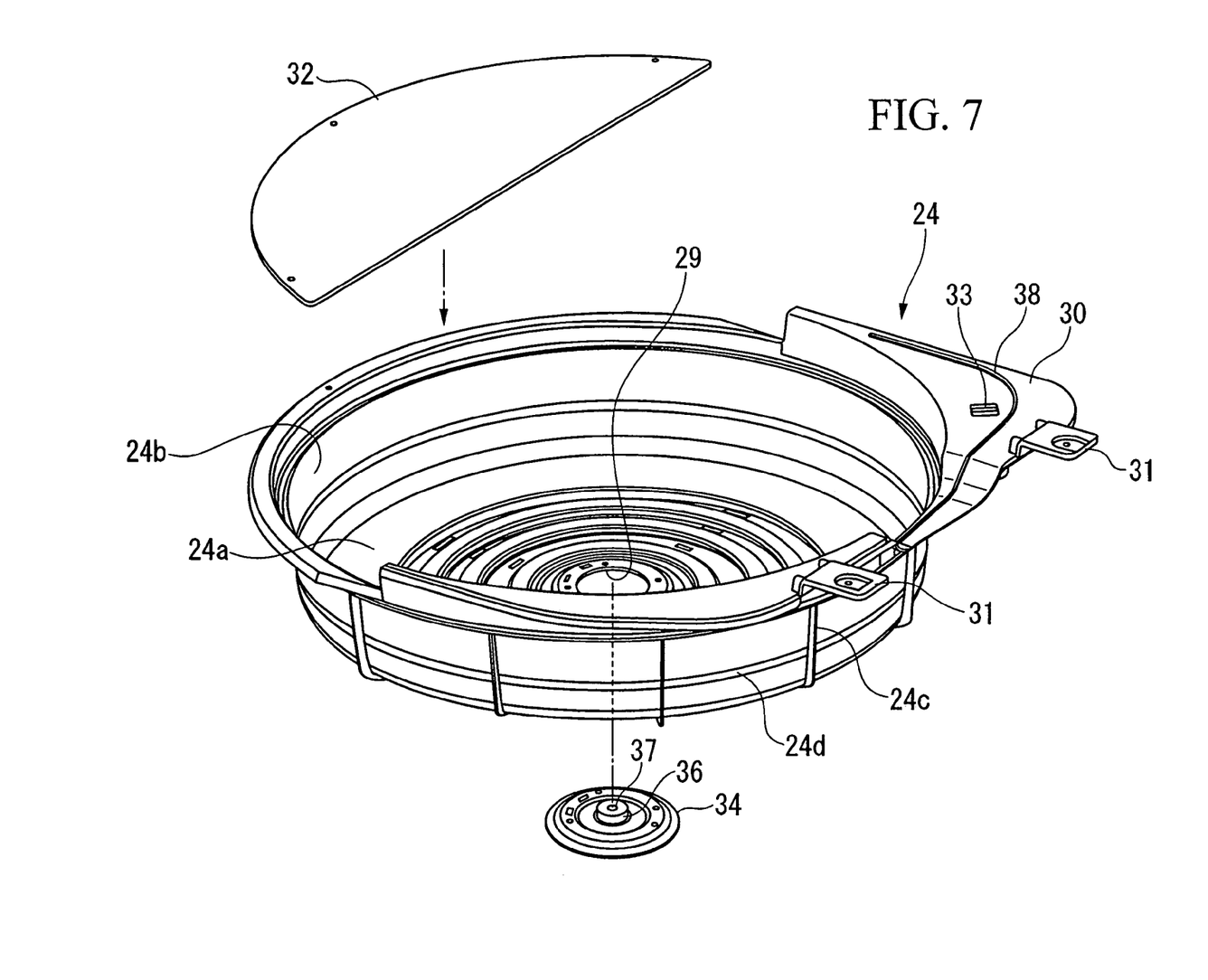
FIG. 7 is an exploded perspective view of a tray main body.

As shown in FIG. 7, the tray main body 24 is formed so that a peripheral wall 24*b* thereof extends slantingly upward from the periphery of a bottom wall 24*a* thereof which is substantially planar, although circular ribs are formed in rings thereupon; and a sound absorption member 26 is provided between the bottom wall 24*a* and the surface of the floor panel 5, and between the peripheral wall 24*b* and the surface of the floor panel 5 which forms the concave storage portion 6. Vertical ribs 24*c* and horizontal ribs 24*d* are formed in the peripheral wall 24*b*, in order to ensure its strength, rigidity, and endurance. A hook 27 is attached to the rear surface of the bottom wall 24*a* of the tray main body 24, and, by an engagement portion 28 which is provided to the bottom wall of the concave storage portion 6 being elastically engaged to the hook 27, the tray unit 23 is fixed in place to the concave storage portion 6 so as to be attached or detached as desired.

The tray main body 24 is formed with a fitting hole 29 in its bottom wall 24*a*, and also comprises a flange portion 30 which projects at one side of the upper edge of the rear portion of the peripheral wall 24*b*, more outwardly than the outer side thereof, and roughly at a right angle. A bracket 31, which is fitted to the floor panel 5, is formed upon the upper edge of this flange portion 30 and the rear portion of the peripheral wall 24*b*. And a partition wall 32 which is semicircular in shape is fitted to the front half portion of the upper edge of the peripheral wall 24*b* of the tray main body 24. Furthermore, a square hole 33 is formed in the flange portion 30, through which a knob 62 of a switch member 61 which will be described hereinafter projects. Note that a seal member 38, which seals against the rear surface of the first lid 8, is fitted to the upper edge of the rear portion of the peripheral wall 24*b*, including the flange portion 30.

And a base plate 34 is fitted with a screw member 35 in the fitting hole 29 in the rear surface of the bottom wall 24*a* of the tray main body 24 which is formed in this manner, as shown in FIG. 5. This base plate 34 comprises a boss portion 36 in its central portion, and a hole 37 is formed in the central portion of this boss portion 36.

Figure 8:
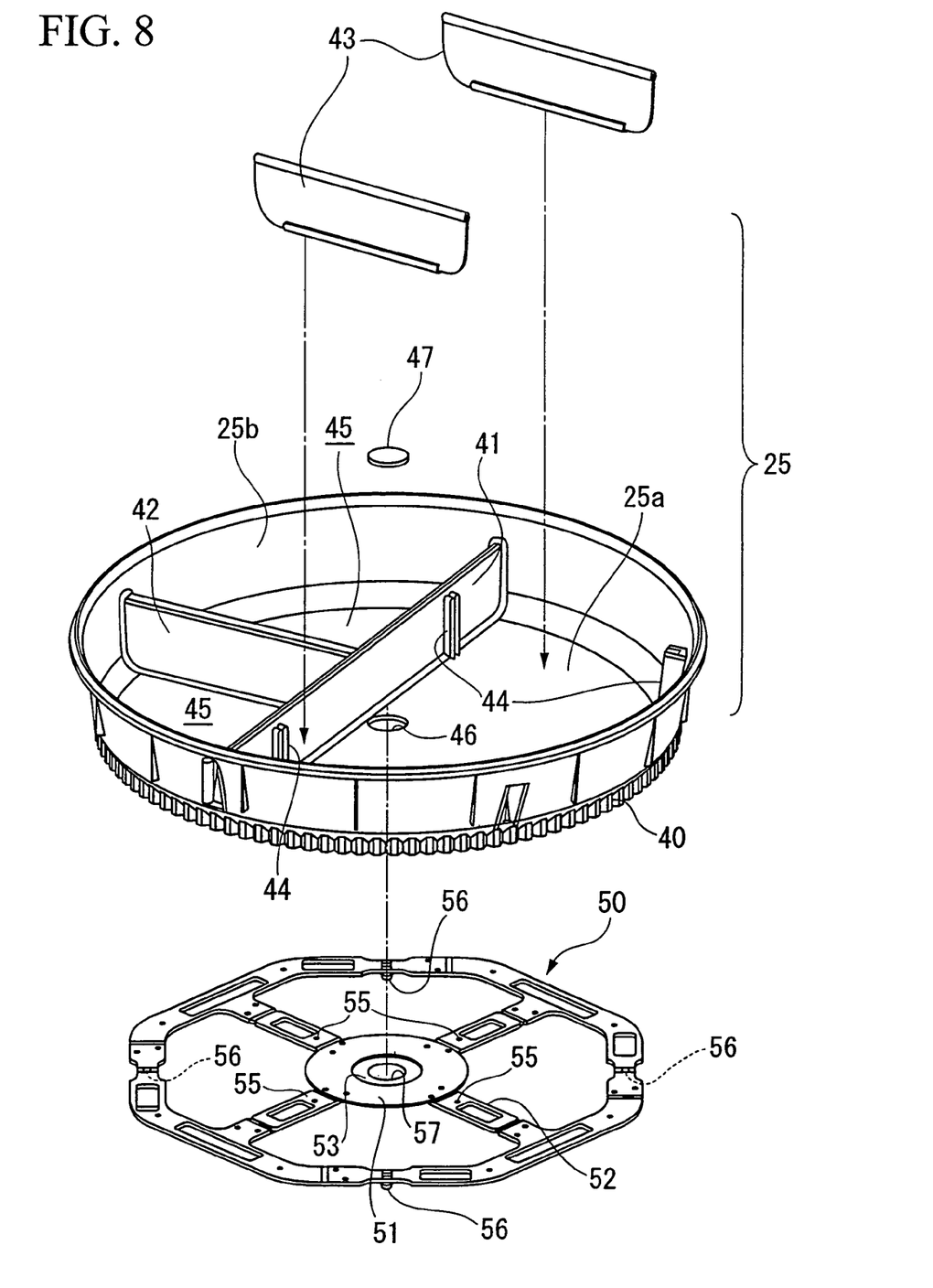
FIG. 8 is an exploded perspective view of a rotating tray.

As shown in FIG. 8, the rotating tray 25 is a member which comprises a peripheral wall 25*b* which rises up from the peripheral edge of a bottom wall 25*a* which is planar and circular in shape somewhat towards the outside, and, in practical terms, this rotating tray 25 is made as a storage section for baggage. At the lower portion of the peripheral wall 25*b* of this rotating tray 25, around its entire periphery, there is formed an engagement portion 40 which consists of a plurality of projections which are shaped as triangles in cross section. This engagement portion 40 is formed in a shape which matches the tip end portion of a lock rod 101 which will be described hereinafter. Furthermore, a first separation wall 41 is formed at the inner portion of this rotating tray 25 so as to rise up from the bottom wall 25*a* along a diameter thereof, and a second separation wall 42 is provided as extending from the central portion of this separation wall 41 towards the peripheral wall 25*a* at the front side thereof; and, moreover, two separation walls which extend from the first separation wall 41 towards the peripheral wall 25*a* at the rear side thereof and which serve as third separation walls 43, 43 are fitted to engagement portions 44, so as to be removable at will. Accordingly, in the state in which these third separation walls 43 are fitted, a maximum of five separate storage locations 45 (refer to FIG. 6) are defined within the rotating tray 25. Furthermore, an opening portion 46 is formed in the central portion of the bottom wall 25*a* of this rotating tray 25, and a cap 47 is provided which closes this opening portion 46.

In this manner it becomes possible to put in place the separation walls freely as described above, since a locking unit 60 which will be described hereinafter is not disposed within the rotating tray 25.

In order to reinforce the rotating tray 25, a reinforcement member 50 made from metal is arranged to be fitted at the rear surface of the bottom wall 25*a* of the rotating tray 25. This reinforcement member 50 is a ring shaped member to which linking portions 52 are provided so as to extend at intervals of 90° apart in outwardly radiating directions from a fitting portion 51 which is provided at its central portion, and a bearing 53 is pressed in at the central portion of this fitting portion 51.

And this reinforcement member 50 is laid against the bottom wall 25*a* of the rotating tray 25, and fixing pins 54 (refer to FIG. 5) which are formed upon the rear surface of the bottom wall 25*a* are inserted and welded into holes 55 of the reinforcement member 50, so that the rear surface of the bottom wall 25*a* of the rotating tray 25 is reinforced by this reinforcement member 50. Note that rollers 56 are fitted to the rear surface of the reinforcement member 50, in order for the rotation of the rotating tray 25 to be performed smoothly.

The rotating tray 25 according to the above structure is stored within the tray main body 24, and the boss portion 36 of the base plate 34 on the side of the tray main body 24 is inserted into a hole 57 of the bearing 53 on the side of the rotating tray 25, so that the rotating tray 25 is assembled to the tray main body 24 so that it is supported thereby and can be freely rotated therein, and finally the above described cap 47 is set into the opening portion 46 of the rotating tray 25. And, as shown in FIG. 5, a washer 58 is inserted from the side of the base plate 34, and a screw 59 is inserted thereinto and the cap 47 is tightened, and thereby it is possible for the assembly of the rotating tray 25 to the tray main body 24 to be concluded. In this manner, the cap 47 and the hole 37 of the base plate 34 are rotationally fixed with respect to one another.

As shown in FIG. 5, a locking unit (engagement device) 60 is provided at a location which is surrounded by the concave storage portion 6 and the peripheral wall 24*b* and the flange portion 30 of the tray main body 24. This locking unit 60 is a mechanism for stopping the rotation of the rotating tray 25 by a lock rod 101 of this locking device 100 engaging to the above described engagement portion 40 of the rotating tray 25, upon a knob 62 of a switch member 61 being pressed when the concave storage portion 6, in other words the tray unit 23, is closed by the first lid 8. Furthermore, even if to some extent positional deviation in the upwards and downwards direction has occurred in practice due to assembly errors, dimensional errors or the like, the construction is such as to be able to absorb this deviation.

Figure 9:
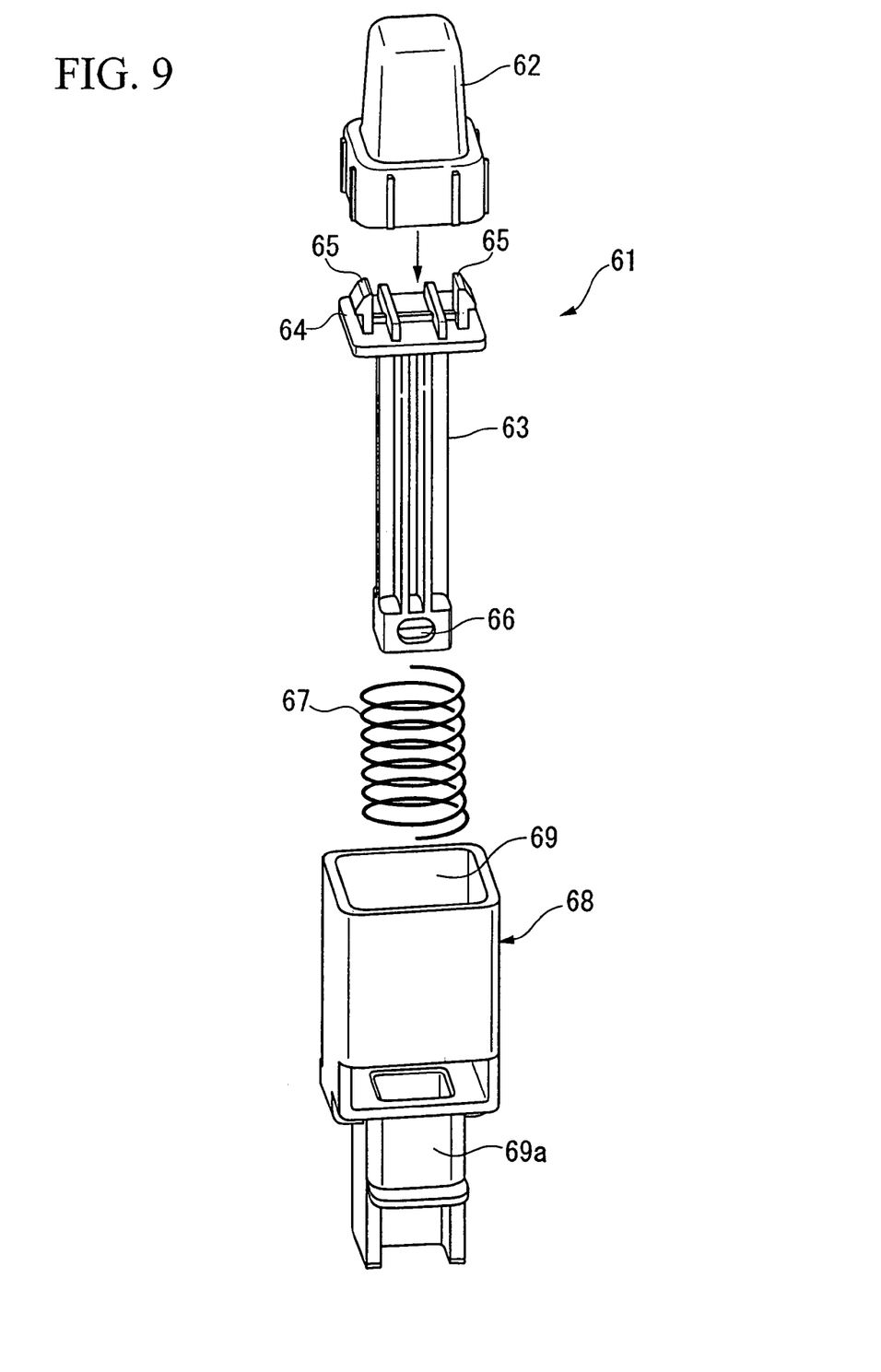
FIG. 9 is an exploded perspective view of a switch member.

FIG. 9 shows this switch member 61 which, when the first lid 8 is closed, is pressed downwards thereby. This switch member 61 comprises the abovementioned knob 62 at an upper portion thereof. This knob 62, as shown in FIG. 7, is a member which projects upwards from the square hole 33 which is provided in the tray main body 24, and its upper portion is formed in the shape of a square pyramid with its edges rounded off. A rod member 63 is fitted at the lower portion of this knob 62. This rod member 63 is a member which comprises a seat 64 of which the upper portion supports the knob 62, and is engaged to the knob 62 by engagement claws 65 formed upon this seat 64 so as to be integral therewith; and an elongated hole 66 which extends in the sideways direction is formed in the side surface of the lower end portion of the rod member 63. A spring 67 is fitted around the outside surface of the rod member 63, and the rod member 63, with the knob 62 fitted thereto as described above, is inserted into a switch case 68 so as to be slidable in the upwards and downwards direction.

The switch case 68 is a member which is a square shaped tube, and a spring receiving portion 69 is formed in its upper half portion, while its lower half portion is formed as a guide portion 69a for the aforesaid rod member 63. Accordingly, the spring 67 is installed between the seat 64 of the rod member 63 and the bottom wall of the spring receiving portion 69 of the switch case 68, and the knob 62 comes to be set in a direction of projection, in other words, in a state in which it projects in the upwards direction.

Figure 10:
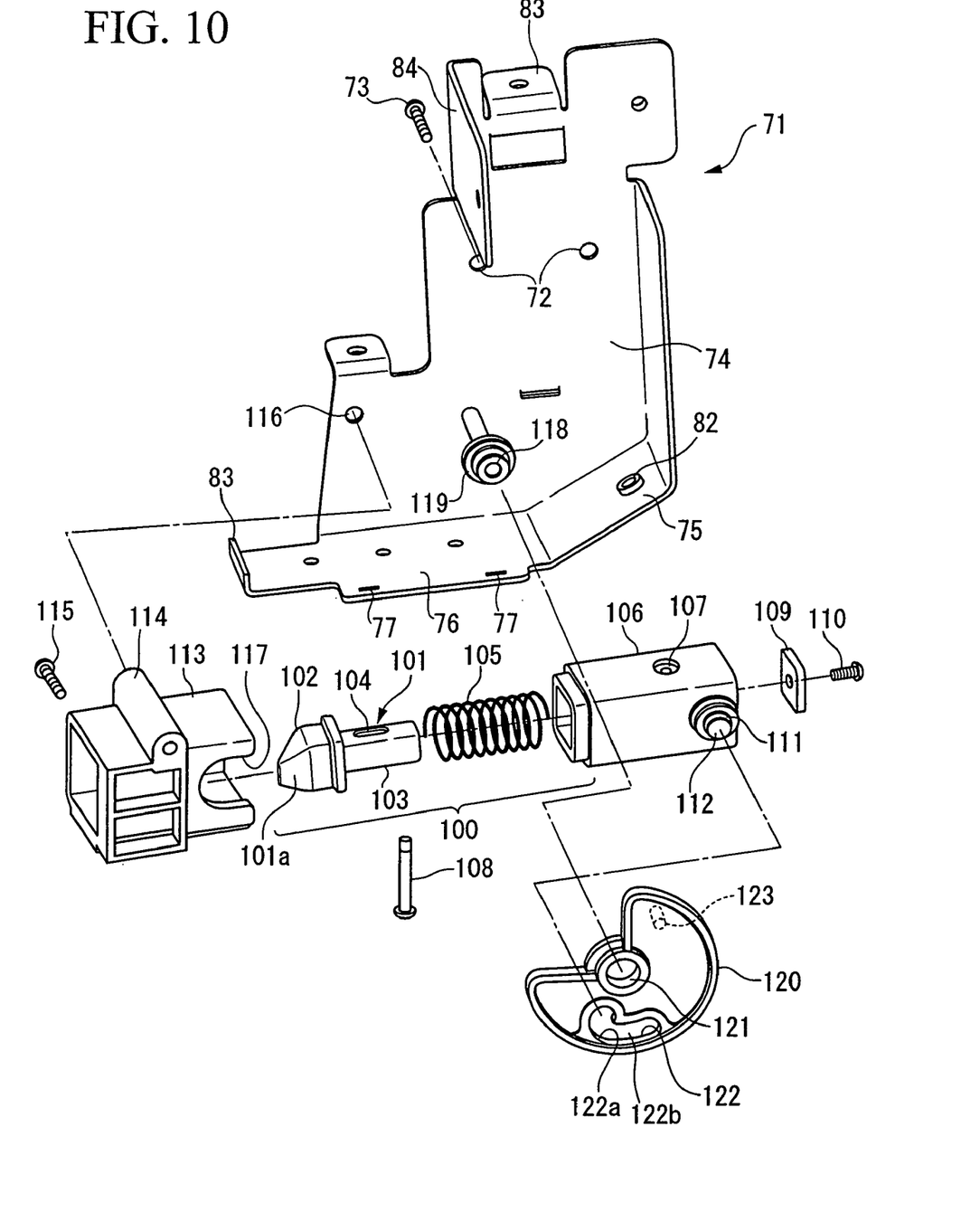
FIG. 10 is an exploded perspective view of a case unit and a lock device and associated elements.

This switch case 68 of the switch member 61 which has the above described structure is fixed by a fitting portion 70 of its spring receiving portion 69 (shown in FIGS. 12 and 13) to fitting holes 72 of the case unit 71 by the use of screws 73 shown in FIG. 10.

Figure 11:
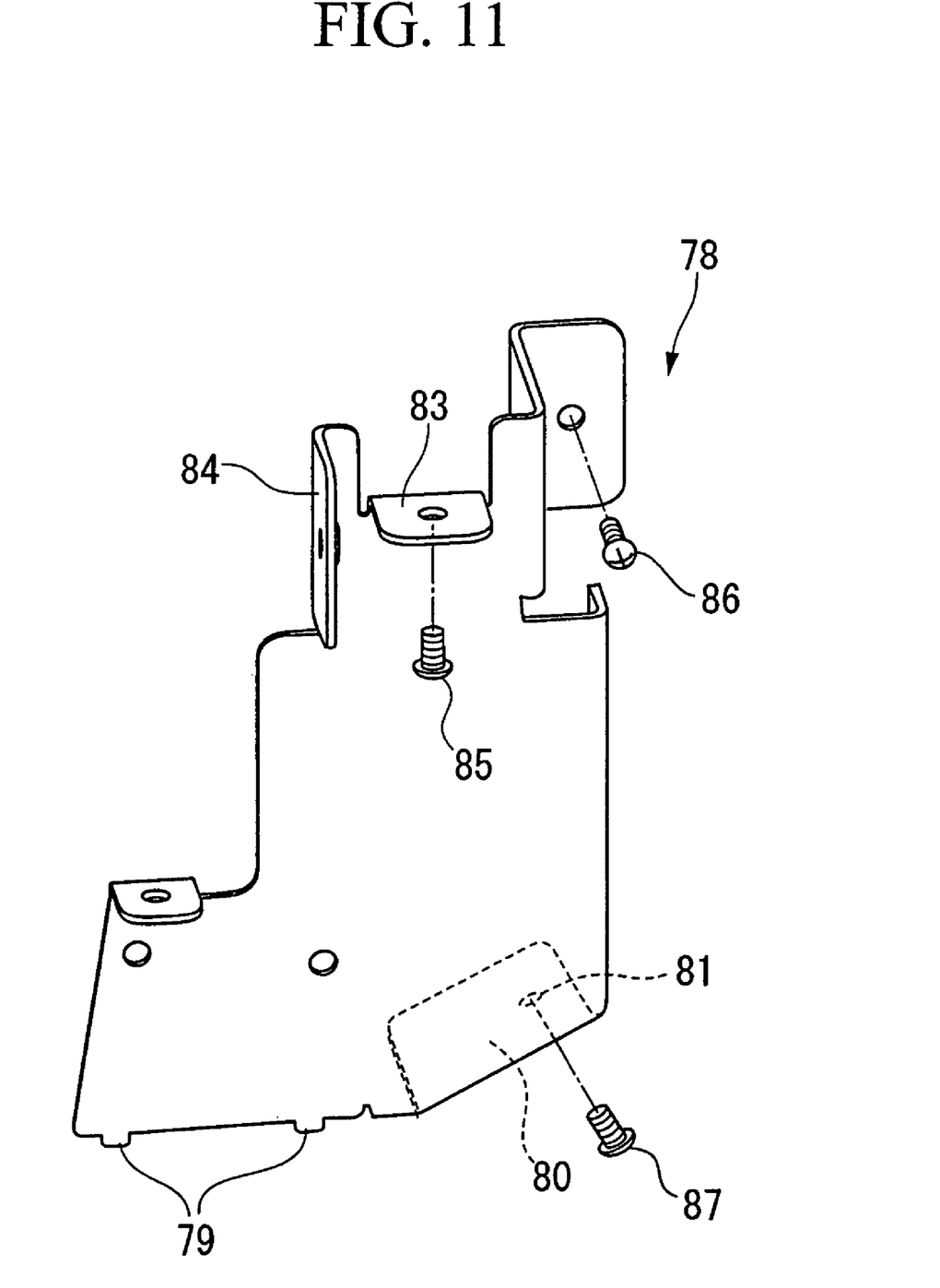
FIG. 11 is a perspective view of a case lid.

Here, as shown in FIG. 10, the case unit 71 is a member made from metal which comprises a roughly letter L shaped side wall 75 and bottom wall 76 which are formed from the rear side edge of a base wall 74 along its lower side edge so as to follow the concave storage portion 6, with the switch member 61 and a lock device 100 which will be explained hereinafter being fitted to the base wall 74. Moreover, claw portions 79 which are formed upon the lower edge of a case lid 78 shown in FIG. 11 are inserted into engagement holes 77 which are formed in the bottom wall 76 of this case unit 71, and, furthermore, a side flange portion 80 of this case lid 78 is fitted against the side wall 75 of the case unit 71, so that respective fitting holes 81 and 82 in them are mutually aligned together, and thereby this case lid 78 is fitted to the case unit 71. And an engagement portion 83 which is formed upon the front edge of the case unit 71 is engaged with an engagement portion 84 of the tray main body 24 shown in FIG. 5, and then the upper surface fixing bracket 83 and the side surface fixing bracket 84 which are provided upon the upper portions of this case unit 71 and case lid 78, and the side flange portion 80 and the side wall 15, are secured to the floor panel 5 by screws 85, 86, and 87, and thereby the case unit 71 and the case lid 78 are fitted to the floor panel 5.

Furthermore, a lock device 100 is provided to the lower portion of the case unit 71. This lock device 100 comprises a lock rod 101 which engages to the engagement portion 40 of the above described rotating tray 25. This lock rod 101 has a head portion 102 with slanting surfaces 101a which are formed so that the vertical walls at the tip of the head portion 102 approach each other and, upon the rear side of this head portion 102, there is integrally formed a rod portion 103 which is narrower than the head portion 102. Here, a long elongated hole 104 is formed by being pierced in the vertical direction through the rod portion 103, so that the longitudinal direction thereof extends in the fore and aft direction of the rod portion 103.

Furthermore, a spring 105 is fitted over the rod portion 103 and is stopped against its head portion 102, and the lock rod 101 is fitted to the rod case (engagement rod) 106 in a state with this spring 105 mounted thereon.

The rod case 106 is a square tubular member, and in its upper and bottom wall there is formed a hole 107 which corresponds to the elongated hole 104 of the rod portion 103, and a pin 108 which is inserted into this hole 107 is inserted into the elongated hole 104 of the lock rod 101 which is inserted into the rod case 106, so that the lock rod 101 is fixed to the rod case 106. Furthermore, a bush 109 which closes the open rear portion of the rod case 103 is fixed therein by a screw 110. And, in the left side wall of the rod case 106, there is provided a pin 112 having a stepped element 111 which is inserted into a guide hole (guide means) 122 of a cam 120 which will be described hereinafter. Here, in the broad sense, the pin 112, the cam 120 and the guide hole 122 constitute a position adjustment mechanism; and, in the narrow sense, the pin 112 and the guide hole 122 constitute the position adjustment mechanism.

And, the lock device 100 which has this type of structure is inserted into a case housing 113 which is of tubular form, and a fitting portion 114 of this case housing 113 is fixed to a fitting hole 116 of the case unit 71 by a screw 115. Here, a cutaway portion 117 is formed upon the case housing 113, so that an arc shaped location is eliminated which corresponds to the pin 112 of the rod case 106 of the lock device 100.

And, as shown in FIG. 10, a pin 118 is formed as projecting from the base wall 74 of the case unit 71, and the cam 120 is supported by a stepped portion 119 of this pin 118, so as to be rotatable thereon. This cam 120 is a member of circular plate shape which comprises, at its central portion, a support hole 121 which is fitted over the stepped portion 119 of the pin 118, and it is a member whose upper left side is shaped as being cut away over an angular range of approximately 90°. And, below the support hole 121, there is formed a guide hole 122 of roughly letter L shape, which is bent around while being bounded by a curved portion 122a, with its extent in the peripheral direction being long, and with its front side which extends towards the support hole 121 being short. Furthermore, a pin 123 is projected at the rear side of the cam 121 above the support hole 121.

Here, an over stroke section 122b is provided in the guide hole 122 upon the outer peripheral edge of the cam 120 from the curved portion 122a, and this permits the movement of the pin 112 only within a positional error range for the closing action of the first lid 8.

By this over stroke section 122b, even if there is a positional error in the closing action of the first lid 8, and the pin 112 has been moved by just a distance (error range) S (refer to FIG. 13) within this error range, the movement of the pin 123 is not transmitted to the rod case 106.

And the guide hole 122 of the cam 120 is fitted over the stepped element 111 of the pin 112 of the lock device 100, and the pin 112 is fitted into the elongated hole 66 of the rod member 63 of the previously described switch member 61.

In this manner, the case lid 78 is fitted to the case unit 71 to which the switch member 61, the lock device 100, and the cam 120 have been fitted, and the assembly is then fitted to the floor panel 5, as previously described.

Next, the operation of this system will be explained with reference made to FIGS. 12 and 13.

Figure 12:
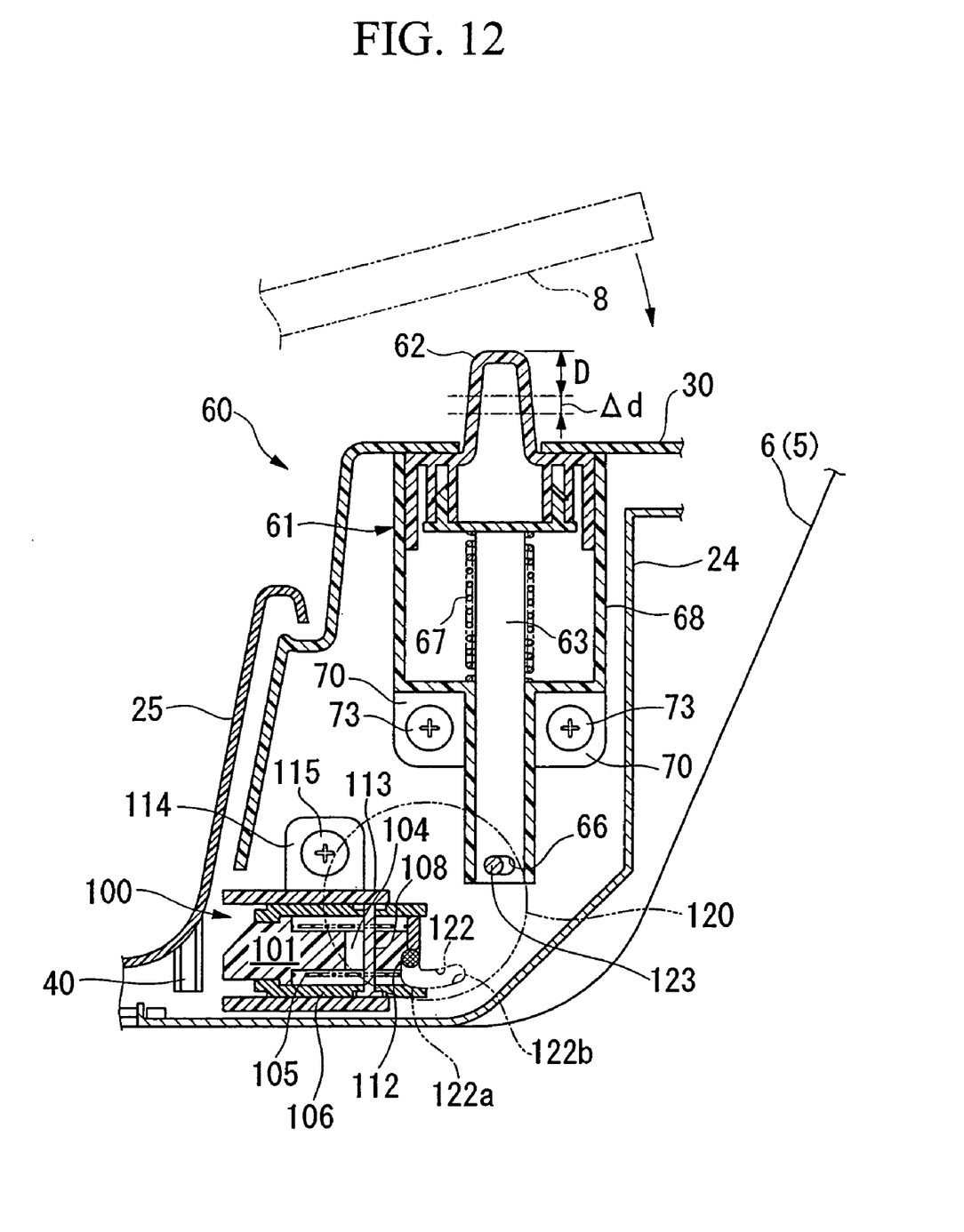
FIG. 12 is a figure for explanation of operation.
Figure 13:
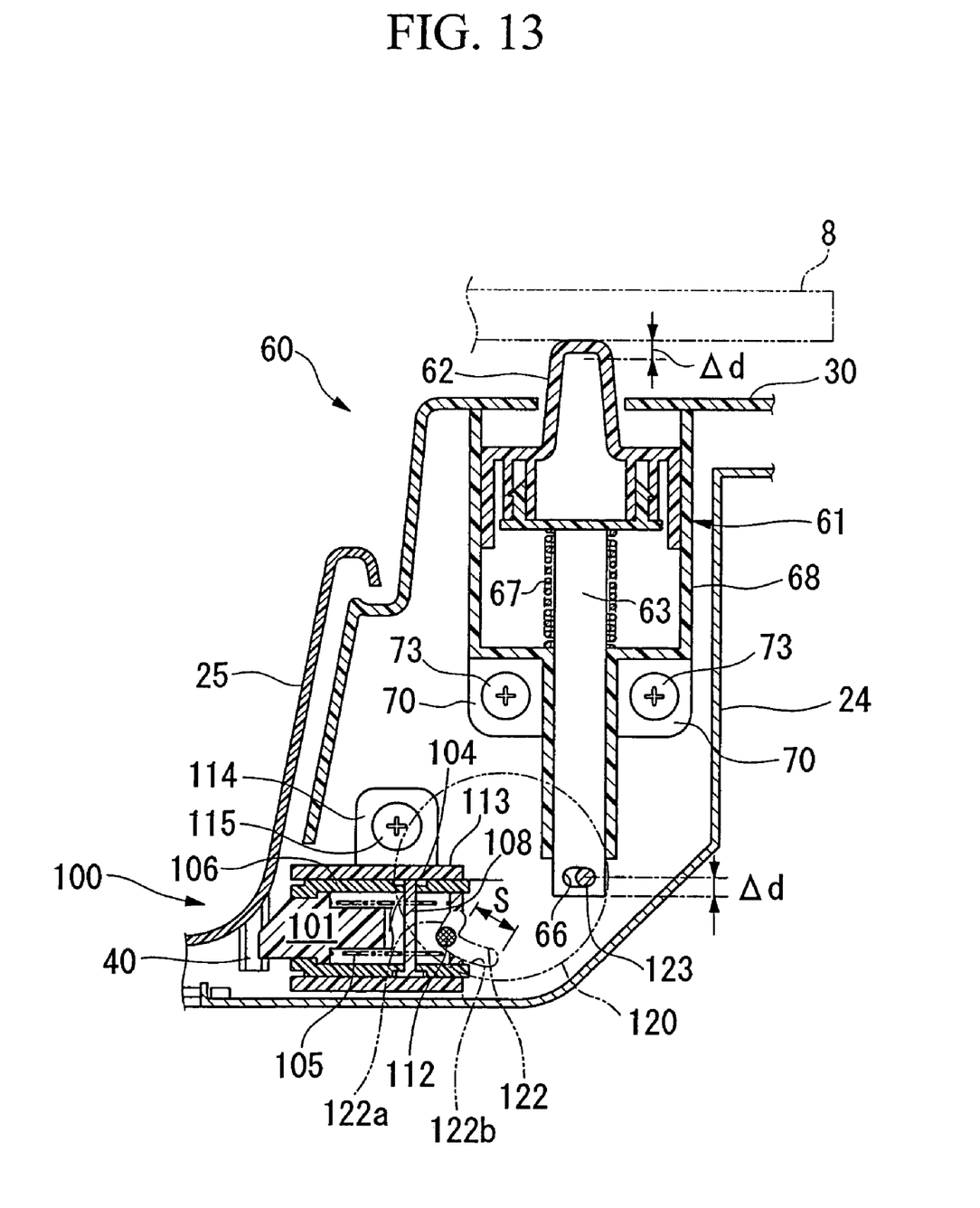
FIG. 13 is another figure for explanation of operation.

FIG. 12 shows the apparatus in its state with the first lid 8 opened, while FIG. 13 shows it in its state with the first lid 8 closed. Note that both of these figures have been simplified in order to make the operation easier to understand. Furthermore, in order to make the operation easier to understand, the pins 112, 123, and 108 are shown by hatching, and hatching for parts other than these three pins is omitted. And the pin 108 is only partially shown in FIG. 13, for the convenience of depiction in the figure.

As shown in FIG. 12, in the state of the apparatus in which the first lid 8 is opened, the rod member 63 of the switch member 61 is pressed by the spring 67, and is biased in the upward direction by the spring 67, and accordingly the knob 62 comes to be in the state of being projected from the square hole 33 of the flange portion 30 of the tray main body 24.

At this time, since the cam 120 is rotated in the counterclockwise direction by the pin 123 which is engaged to the elongated hole 66 of the rod member 63, accordingly the lock rod 101 inside the rod case 106 which has been pulled to the right side in the figure by the pin 112 which is in the state in which it is engaged with the inside terminal end of the guide hole 122 of the cam 120 is retracted, and the head portion 102 of the lock rod 101 is not engaged with the engagement portion 40 of the rotating tray 25.

Accordingly, in this state, the persons in the vehicle are able to rotate the rotating tray 25, to put items of baggage into any desired one of the storage portions 45 freely at will as desired, to rotate the rotating tray 25 so as to bring any specified one of the storage portions 45 to hand as desired, and, according to requirements, they can easily take out any item of baggage desired from any of the storage portions 45 as desired, even if this item of baggage is quite small. In this case, it is possible to ensure smooth rotation of the rotating tray 25, due to the provision of the bearings 53. At this time, if the second lid 12 is opened, even the persons riding in the front seats of the vehicle are able easily to put in and to take out items of baggage. Accordingly, as a whole, it is possible to utilize the storage space in the rotating tray 25 efficiently, and the use of this apparatus becomes very convenient.

Next, when the first lid 8 is closed as shown in FIG. 13, then the rear surface of this first lid 8 presses the knob 62 of the switch member 61 against the spring 67. When this occurs, the rod member 63 moves downwards, so that the elongated hole 66 of the rod member 63 moves in the downward direction, and the cam 120 is rotated in the clockwise direction by the pin 123 which is engaged to this elongated hole 66. At this time, the pin 123 is displaced to a certain extent to the outer circumferential side of the cam 120, but the shifting of this pin 123 is nevertheless ensured, since the hole 66 through which it is passed is elongated.

And, by the rotation of this cam 120, the pin 112 which is in its state in which it is engaged with the inner terminal end of the guide hole 122 is relatively displaced to the outer circumferential side of the cam 120, and arrives at the curved portion 122*a* of the guide hole 122.

When this happens, the lock rod 101 in the rod case 160 which has been pulled out to the right side in the figure by the movement of this pin 112 moves forward, and the head portion 102 of this lock rod 101 comes to be in its state in which it is engaged to the engagement portion 40 of the rotating tray 25. Since in this state it is not possible for the rotating tray 25 to rotate even if the vehicle moves, accordingly the items of baggage which are stored in the various storage portions 45 do not move around by such rotation, so that it becomes possible to keep the positions in which they are stored under control. Accordingly it never happens that it becomes impossible to know the position of an item of baggage when taking it out, so that the process of taking out baggage becomes smooth. Furthermore, it is possible to suppress generation of noise, since there is also no generation of clattering due to rotation of the rotating tray or crashing around of baggage.

And, at this time, if a large force is applied to the rotating tray 25 in a direction to rotate it, when this force acts from the engagement portion 40 upon the slanting surfaces 101*a* of the lock rod 101, the lock rod 101 is pushed back into the rod case 106 while pressing the spring 105 so as to shorten it, and accordingly the rotating tray 25 is able to rotate and release this force. Accordingly it is possible reliably to avoid damage to the engagement portions of the engagement portion 40 and the lock rod 101, by setting the elastic force of the abovementioned spring 105 to a suitable value.

Here, in the above described state in which the first lid 8 is closed, let it be supposed that the position in the vertical direction of the first lid 8 has more or less deviated; for example, as shown in FIGS. 12 and 13, let it be supposed that the rod member 63 of the switch member 61 has dropped to a position which is just Δd deeper than the predetermined range for the stroke amount D. In other words, let it be supposed that the rod member 63 has been displaced from the state shown in FIG. 13. When the rod member 63 thus drops, the cam 120 rotates further in the clockwise direction, but the pin 112 which is positioned in the curved portion 122*a* of the guide hole 122 is able to shift by just a distance S in the counterclockwise direction relatively along the over stroke section 122*b* which is formed in the circumferential direction of the guide hole 122. In other words, since the over stroke section 122*b* is formed to have the rotational axis of the cam 120 as its center, accordingly, even if the cam 120 rotates, this movement is not transmitted to the pin 112, so that the rod case 106 of the lock device 100 is not displaced. Accordingly, no influence is exerted upon the engagement state of the lock rod 101 with the engagement portion 40. To put this in another way, by ensuring that, even if due to manufacturing errors or assembly errors or the like the position in the vertical direction of the first lid 8 has more or less deviated, the rotation of the cam 120 is not transmitted to the pin 112 by the guide hole 122 of the cam 120, this deviation can be accommodated, ant it is possible reliably to maintain the state in which the engagement portion 40 is engaged to the lock rod 101, and thereby to stop the rotation of the rotating tray 25. Accordingly, it is possible to enhance the operational reliability by a further level, even if the manufacturing accuracy and the assembly accuracy are not stringently controlled.

And, since the engagement portion 40 is provided along the entire periphery of the peripheral wall 25*b* of the rotating tray 25, and in correspondence thereto the locking unit 60 is provided between the concave storage portion 6 and the rotating tray 25, the engagement portion 40 and the locking unit 60 come to be positioned outside the rotating tray 25. Accordingly, as compared to a case in which the engagement portion 40 and the locking unit 60 are provided inside the rotating tray 25, it is possible to make the storage space within the rotating tray 25 larger, and thereby it is possible to ensure the maximum possible limit for the amount of baggage which can be stowed therein.

Furthermore, since in this preferred embodiment the engagement portion 40 which is formed as teeth upon the lower portion of the peripheral wall 25*b* of the rotating tray 25 is made so as to extend all around its periphery, accordingly, as compared with a case in which it is arranged to stop the rotation of the rotating tray 25 by providing a complicated separate mechanism and by regulating the movement within this mechanism, it is possible to ensure that the structure does not easily break down, so that the rotating tray 25 is reliably locked. In particular, since the engagement portion 40 which is provided to the rotating tray 25 is of comparatively large diameter, there is the advantage that the elastic force of the spring 105 which is required for controlling the movement thereof is relatively small, as compared to a case in which the diameter of this engagement portion 40 is small.

It should be understood that this invention is not to be considered as being limited to the above described preferred embodiment thereof; for example, it is also possible to provide the pin 123 and the elongated hole 66, and the pin 112 and the guide hole 122, upon the mutually opposite members. Furthermore, it is also possible to utilize screws or the like instead of the claws 65, and also it is possible to utilize various other types of fitting construction. Yet further, although the case has been explained in which the engagement portion 40 was formed upon the lower side of the peripheral wall 25b of the rotating tray 25, it is also possible for it to be formed upon the upper side of this peripheral wall 25b.

This invention, for example, may be applied as a technique for improving the under floor storage of a vehicle.

Effects of the Invention

According to the present invention, if the lid is opened and the rotating tray is rotated, it is easy to extract baggage which has been stored inside the rotating tray, whichever location it has been stored in; and there are the advantageous effects that it is possible to utilize the entire storage space within the rotating tray at high efficiency, and that the convenience of use becomes good.

Furthermore since, when the lid is closed, the engagement device engages with the engagement portion of the rotating tray and prevents rotation of the rotating tray, accordingly it is possible to prevent the items of baggage from moving around within the rotating tray when the vehicle is moving.

As a result, there are the advantageous effects that the user does not lose a grasp of the position of an item of baggage which has been stored in the rotating tray due to rotation of the moving tray while the vehicle is moving, or due to movement of baggage within the rotating tray while the vehicle is moving; and moreover that there is no damage to items of baggage due to movement thereof within the rotating tray; and furthermore that it is possible to prevent the generation of noise due to rotation of the rotating tray while the vehicle is moving.

Furthermore, since an engagement portion is provided to the rotating tray, and an engagement device which corresponds thereto is provided to the concave storage portion, accordingly it is possible to provide the engagement portion and the engagement device outside the rotating tray, and thus, as compared to a case in which the engagement portion and the engagement device are provided inside the rotating tray, it becomes possible to ensure that the storage space in the rotating tray is maximized, and the advantageous effect accordingly accrues that it is possible to increase the amount of storage for baggage.

According to the present invention, there is the advantageous effect that, even if the position of the lid with respect to the concave storage portion in the vertical direction has more or less deviated, since this deviation is adjusted by the position adjustment mechanism of the engagement device, accordingly it is possible to engage the engagement device to the engagement portion in a secure manner, and thereby it is possible to stop the rotation of the rotating tray; and accordingly proper operation is ensured by absorbing errors in manufacture and errors in assembly, and thus it is possible to enhance the operational reliability by yet a further level.

According to the present invention, there is the advantageous effect that, even if the position of the lid with respect to the concave storage portion in the vertical direction has more or less deviated, since it is possible by the position adjustment mechanism that, if the engagement rod is engaged with the engagement portion due to closing operation of the lid, displacement outside a predetermined range of the switch member which is caused by deviation of the position of the lid in the vertical direction does not arrive at the engagement rod, accordingly proper operation is ensured by absorbing errors in manufacture and errors in assembly, and thus it is possible to enhance the operational reliability by yet a further level.

According to the present invention, there is the advantageous effect that, even if there is an error in the closed operational position of the lid, and the pin has shifted within the predetermined range of this error, this movement of the pin is not propagated as far as the engagement rod, due to the provision of the over stroke section within the guide means, and accordingly proper operation is ensured by absorbing errors in manufacture and errors in assembly, and thus it is possible to enhance the operational reliability by yet a further level.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An under floor storage compartment for a vehicle, comprising:
   a rotating tray in a concave storage portion which is provided underneath a floor panel;
   a lid which opens and closes said concave storage portion;
   an engagement portion upon said rotating tray; and
   an engagement device in said concave storage portion which stops the rotation of said rotating tray by engaging to said engagement portion;
   wherein said engagement device is engageable to said engagement portion of said rotating tray in association with the closing action of said lid.

2. The under floor storage compartment for a vehicle as claimed in claim 1, wherein said engagement device comprises a position adjustment mechanism which absorbs upwards and downwards positional deviation of said lid.

3. The under floor storage compartment for a vehicle as claimed in claim 1, wherein said engagement device comprises an engagement rod which engages with said engagement portion, and further comprises a switch member which executes its stroke upon closing operation of said lid, a linking member which is linked thereto, and a position adjustment mechanism between said linking member and said engagement rod which absorbs upwards and downwards positional deviation of said lid.

4. The under floor storage compartment for a vehicle as claimed in claim 3, wherein said linking member is a cam which rotates together with the operation of said switch member, and wherein said position adjustment mechanism comprises a pin which is provided to said engagement rod, and a guide means which is formed upon said cam and which is engaged with said pin, wherein said guide means comprises an over stroke section which, when said lid is in its closed operational position, permits shifting only of said pin within a predetermined error range.

* * * * *